Aug. 16, 1960 — I. SHUR — 2,949,143
FASTENING MEANS FOR PANELS, SHEETS AND THE LIKE
Filed Oct. 12, 1956 — 2 Sheets-Sheet 1

INVENTOR
IRA SHUR
BY
ATTORNEY

Aug. 16, 1960 — I. SHUR — 2,949,143
FASTENING MEANS FOR PANELS, SHEETS AND THE LIKE
Filed Oct. 12, 1956 — 2 Sheets-Sheet 2

INVENTOR
IRA SHUR
BY
ATTORNEY

United States Patent Office 2,949,143
Patented Aug. 16, 1960

2,949,143

FASTENING MEANS FOR PANELS, SHEETS AND THE LIKE

Ira Shur, Bayside, N.Y., assignor to Waldes Kohinoor, Inc., Long Island City, N.Y., a corporation of New York Filed Oct. 12, 1956, Ser. No. 615,632

2 Claims. (Cl. 151—69)

This invention relates to improvements in fastening means for panels, sheets and the like, and more particularly to an improved bolt and nut type fastener for securing two panels or sheets in tight surface engagement.

Fasteners of this type, wherein the stud or bolt and the nut are held captive to their respective panels or sheets (which are hereinafter sometimes referred to for convenience merely as panels) are extensively used in aircraft, frequently to secure two panels having substantial curvature. However, while functioning adequately to secure straight or plane panels, the prior fasteners are not well suited to fastening curved or hinged panels together, because it is inherent in their construction that either the shear sleeve or the bolt proper component of their bolt will normally protrude from the inner surface of the one panel, thus making for difficulties in aligning said components with the hole provided for their reception in the other panel mounting the fastener nut. When such misalignment occurs, it becomes virtually impossible to complete the fastener by threading the bolt into the nut.

Stated broadly, a main object of the invention is the provision of a bolt-and-nut type fastener for securing curved and hinged panels in tight surface engagement which in so constructed and arranged as to preclude the possibility of the bolt components of the fastener being misaligned with the hole or opening provided in the other or nut mounting panel to receive same, thereby making possible tight face engagement of the panels or sheets to be fastened preparatory to completing the fastener.

A more particular object of the invention is the provision, in a bolt and nut type fastener for securing panels and the like in tight surface engagement, of an improved mounting of the shear sleeve in which the bolt proper operates in the panel carrying the same, which provides for movement of both the bolt and shear sleeve to retracted positions in which their inner ends are flush with the inner face of its panel, while at the same time for holding said bolt and sleeve captive to said panel, whereby they cannot accidentally fall out of the panel opening in which they operate.

Yet another object of the invention is the provision, in a bolt and nut type fastener for securing two panels and the like wherein the bolt proper operates in a shear sleeve, in turn fastened to the bolt-carrying panel, and which serves to relieve the bolt proper of any substantially transverse (shear) forces effective thereon, of a novel flush mounting of both shear sleeve and bolt proper in said panel which permits movement of both shear sleeve and bolt to fully retracted positions in which their inner ends are flush with the inner face of said panel.

Still another object of the invention is the provision, in a bolt and nut type fastener for the specified purpose, of a bolt-to-panel mounting characterized in that the shear sleeve and bolt proper components of the fastener bolt are secured so as to be effectively "flush mounted" to the panel or sheet carrying same, as enables said panel to be properly related to and secured in tight surface engagement with another panel.

Yet a further object of the invention is the provision, in a bolt and nut type fastener as aforesaid, of a novel mounting of the bolt and shear sleeve components of the bolt member of the fastener in the panel carrying same, as always maintains both said components captive to said panel but without in any way detracting from the ability of the sleeve and/or bolt to align with the opening provided for their reception in the nut-carrying panel to be fastened to said first panel.

A still further object of the invention is the provision, in a bolt and nut type fastener for curved panels, sheets and the like, of an improved retractible flush-mounted bolt assembly characterized by simple and inexpensive construction and which is efficient and thoroughly dependable in use.

The above and other objects and advantages of the improved fastener means for panels, sheets and the like according to the invention will appear from the following detailed description thereof, in which reference is had to the accompanying drawings depicting a preferred embodiment thereof, wherein.

Figure 3:
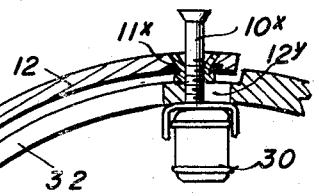
Figure 4:
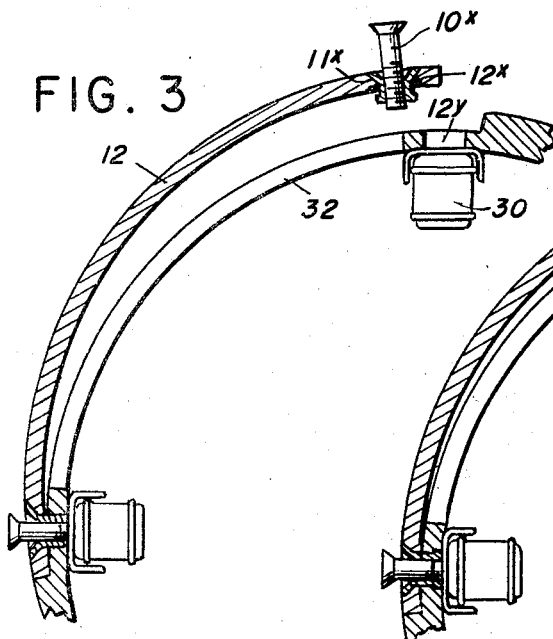
Figure 5:
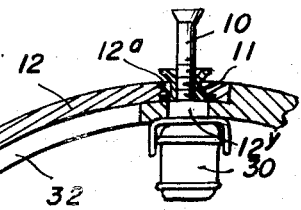
Figure 6:
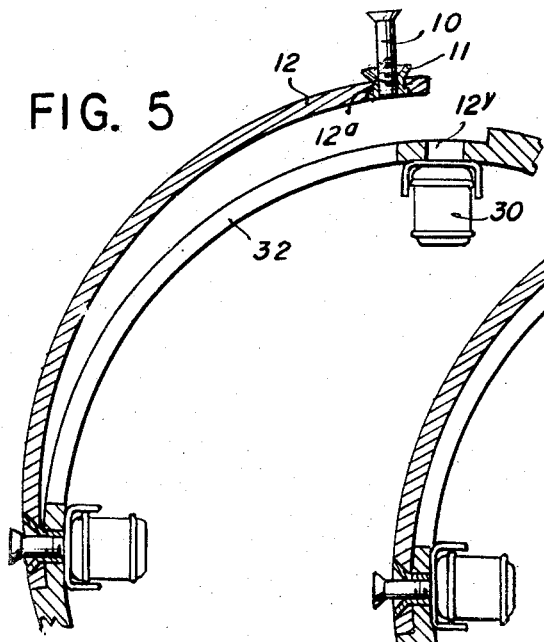

Figs. 3 and 4 illustrated in schematic manner the difficulties encountered in securing together two curved or hinged panels when employing prior non-flush-mounted fastener bolt members; and Figs. 5 and 6 are views similar to Figs. 3 and 4 but illustrating the manner in which the retractible flush mounted fastener-bolt components according to the present invention overcomes the difficulties of the prior fastener in securing curved panels in tight face engagement.

Figure 1:
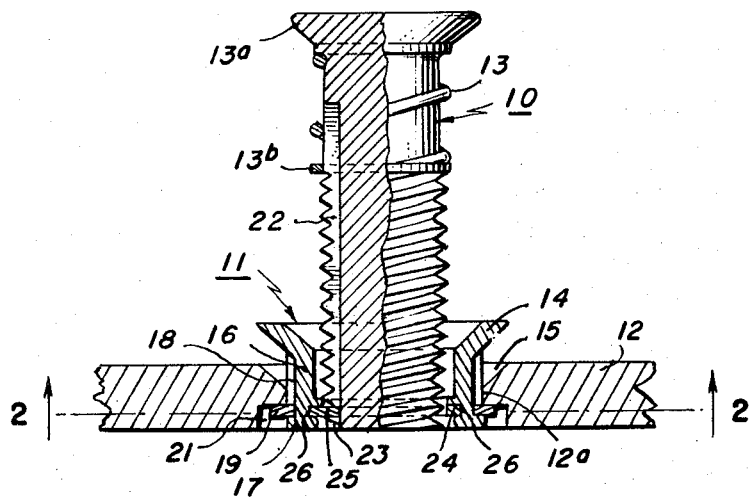
Fig. 1 is a vertical section taken through the retractible flush-mounted bolt and shear sleeve assembly according to the present invention, the view illustrating the bolt and shear sleeve components each in their fully retracted position in which their inner ends are substantially flush with the inner surface of the panel carrying same.
Figure 2:
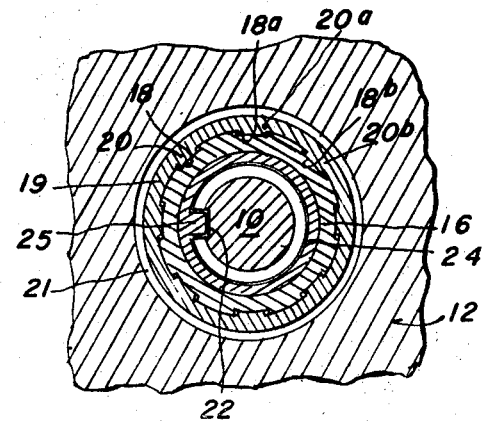
Fig. 2 is a section taken along line 2—2 of Fig. 1.

Referring to the drawings, and particularly to Figs. 1 and 2 thereof, reference numeral 10 designates the bolt proper of the bolt member or assembly which operates in a shear sleeve or bushing 11 extending through an opening 12a provided therefor in a panel 12 which is to be fastened to a second panel (32, Figs. 3–6) mounting the nut element of the fastener as will be described. It will be understood that the shear sleeve is conventionally employed in such a bolt assembly for the purpose of relieving the bolt proper by taking up transverse shearing forces effective thereon. In Fig. 1 both the bolt 10 and the sleeve 11 are shown to be in their respective fully retracted (uppermost) positions, to which they are freely actuable from a normally partially retracted position of bolt with respect to sleeve as established by a spring 13 reactive between the bolt head 13a and a ring 13b encircling the bolt and which is assembled over the threads thereof.

The axial depth of the sleeve 11 is substantially greater than the thickness of the panel 12, and preferably the outer end portion of the sleeve 11 has enlarged frusto-conical head formation 14 enabling it to receive the head 13a of the bolt when the latter is screwed home in its nut. It will be understood that when the sleeve is pushed axially inwardly through the opening 12a, said enlarged head is in turn adapted to seat in the conical countersink 15 provided in the outer face of the panel about said opening.

To hold the shear sleeve 11 captive to the panel 12, i.e. against outward withdrawal from the opening 12a thereof, despite the fact that the shank or body portion 16 of the sleeve has lesser diameter than that of the panel opening, the lower (inner-end) portion of said sleeve is provided with a radial enlargement defining an outwardly (upwardly) facing shoulder 17 which serves as a seat or abutment for a retaining ring or washer 19 disposed to encircle the reduced-diameter body portion 16 of the sleeve. Preferably, said sleeve body portion is provided in its peripheral surface with a plurality of axial slots 18, 18a, 18b, etc., best seen in Fig. 2, and the inner edge of said ring 19 is formed with complemental protrusions 20, 20a, 20b, etc. interfitting with said slots. Thus the ring is in effect keyed to the sleeve body portion 16 whereby it may move relatively axially therealong, but it is of course held to the sleeve by the outer-end enlargement 14 and the aforesaid inner end shoulder 17 of the latter.

Along its outer edge, the retaining ring 19 is adapted to engage with the inwardly (downwardly) facing bottom or floor of a recess 21 cut into the inner face of the panel and extending about the aforesaid panel opening 12a. Thus, upon the shear sleeve 11 moving outwardly the retaining ring 19 bridges the outwardly facing shoulder 17 of the sleeve and the inwardly facing bottom of the recess 21 and thereby serves to secure the sleeve against axial withdrawal from the panel 12 in outward direction. Also, by dimensioning the recess 21 so that its axial depth equals the sum of the axial thicknesses of the retaining ring 19 and of the shoulder forming enlargement 17 of the sleeve, the inner edge of the sleeve is disposed flush with the inner face of the panel when the sleeve assumes its normal retracted position as aforesaid.

According to the invention, the aforesaid bolt 10 is also held captive to the panel and it is moreover so mounted that its inner end may be positioned flush with the inner face of said panel. For this purpose, the bolt 10 is provided with at least one axial slot 22 cut in its outer periphery and terminating at its inner (lower) end a blind end wall defining an outwardly facing shoulder 23. A bolt-to-sleeve retaining ring 24 which is mounted in encircling relation on the bolt is provided with an inner edge protrusion 25 extending as a key into the aforesaid slot 22. The outer edge portion of said retaining ring 24 seats in an inwardly opening groove 26 provided in the bore of the sleeve 11 adjacent the inner end thereof. It will thus be seen that the retaining ring 24 serves to hold the bolt 10 captive to the sleeve 11 (and thereby to the panel 12) while at the same time its connection with bolt and sleeve is such as enables the bolt to be projected axially inwardly through the sleeve and turned on its axis as well, i.e. it enables the bolt to function in normal manner. By proper relative location of the bolt shoulder 23 and the ring-groove 26, the inner end of the bolt is positionable substantially flush with the inner end of the sleeve 11 and hence, upon the sleeve being moved to its outermost or retracted position, with the inner face of the panel 12.

The above described construction results in the bolt 10 having a normal position in which it is partially retracted from the sleeve 11 under the urge of spring 13 reactive therebetween. Hence, the bolt is positioned so that it may be readily grasped and manually pulled to its "flush" position in which its inner end is flush with the inner face of the panel 12, it being understood that the construction and arrangement of the parts is such that in its movement to fully retracted position the bolt also actuates the sleeve to its retracted position in which its inner end is also flush with the inner face of said panel. Alternatively, the bolt and sleeve are free to and to retract to their respecive outermost positions when they hit on a solid object or thing, for example, a panel to which the aforesaid panel 12 is being assembled.

The advantages of a retractible flush-mounted fastener bolt assembly according to the invention in securing two curved or hinged panels, sheets and the like will be understood from a comparison of Figs. 5 and 6 with Figs. 3 and 4, the latter figures illustrating the difficulties encountered in securing typically curved panels by means of a conventional nut and bolt type fastener whose nut is not flush-mounted. In both cases, the curved panel 12 is adapted to be fastened to a correspondingly curved panel 32 by means of spaced nut and bolt type fasteners, of which the bolt assemblies are carried by the outer curved panel 12, and the nut assemblies 30 by the inner panel 32, it being assumed that the two panels 12 and 32 have been correctly secured together at their lower left sides as shown. Said panels are provided with bolt-receiving openings 12x, 12y which must be aligned to enable a bolt 10x according to the prior fastener to be engaged with and in the nut 30. While such alignment of panel holes 12x and 12y would not present any difficulties in the case of the panels being neither curved nor hinged, the alignment of said holes necessary to panel fastening cannot be successfully achieved if either the shear sleeve 11x or the bolt 10x of the prior fastener (corresponding to the shear sleeve 11 and bolt 10 of the present improved fastener) protrude appreciably from the inner face of panel 12. However, according to the prior fasteners, wherein neither the sleeve nor bolt are movable to a flush-mounted position with respect to the inner face of the panel, it was necessary that at least the sleeve 11x protrude through the panel to prevent the same from moving axially out of the panel opening 12x, and it was also usual to thread the bolt a substantial distance inwardly through the protruding sleeve (as shown) to prevent accidental or unintentional unthreading of the bolt from the sleeve. However, when so protruding, the sleeve 11x and bolt 10x are no longer centered with the nut 30. This means that when attempt is made to push or thread the bolt into the nut, it may move into the panel opening 12y but it cannot enter the nut opening because of its misalignment therewith, with the result that the fastener fails completely.

On the other hand and as seen in Fig. 5, when both the shear sleeve 11 and the bolt 10 are each free to move outwardly to their fully retracted positions in which their inner ends are flush-mounted according to the invention, the sleeve and bolt are always centered with the nut 30. Hence, referring to Fig. 6, panel 12 may be brought into tight face engagement with panel 32, with assurance that the shear sleeve will enter the opening 12y provided therefor in panel 32 and also that the bolt 10 and nut 30 are coaxially disposed as permits the bolt to be screwed home in the nut 30.

Without further analysis, it will be appreciated that the improved retractible flush-mounted bolt assembly for nut and bolt type fasteners for securing panels, sheets and the like as described achieves the objectives of the invention as explained above in effective and thoroughly dependable manner. However, as many changes could be made in carrying out the above constructions without departing from the scope of the invention, it is intended that all matter contained in the above description or shown in the accompanying drawing shall be interpreted as illustrative and not in a limiting sense.

I claim:

1. In a bolt and nut-type fastener for connecting panels and the like having bolt openings, the combination of a bolt adapted to extend through said openings for cooperation with a nut, a shear sleeve for relieving the bolt from shear forces to which it may be subjected due to the connected panels tending to strain and/or shift laterally of one another, and means for holding both said bolt and shear sleeve captive to the relatively outer panel and also for holding said bolt in a normal position of partial retraction within the opening of said outer panel from which it, together with said sleeve, is freely movable to fully retracted positions in which their corresponding inner ends are flush with the inner face of said outer panel, said shear sleeve consisting of a radially rigid, circumferentially continuous sleeve member disposed within said opening and coaxial with said bolt, said sleeve member having external diameter less than that of the panel openings and axial length greater than the thickness of said outer panel as permits its entry into the opening of the inner panel when said panels are connected, said sleeve member further having internal diameter and wall thickness as provides for the accommodation of bolt-retracting means between bolt and sleeve and protection of the bolt from the aforesaid shear forces, and said sleeve member further having radial enlargements at both its ends, of which the outer-end radial enlargement has greater diameter than that of the opening of said outer panel and the inner-end radial enlargement has diameter substantially equal to that of said opening and defines an axially-outwardly facing shoulder, said outer panel having a countersunk recess in the outer face for accommodating said outer-end enlargement and a countersunk recess in its inner face whose bottom wall forms an axially-inwardly facing shoulder extending about the inner end of its said opening, a first retaining ring encircling said sleeve member and being held thereto by said inner-end enlargement thereon and having an outside diameter corresponding substantially to that of said inner-end recess, whereby said ring is operative between said shoulders to secure the sleeve member against outward separation from said outer panel while permitting its retraction therefrom, the axial thickness of said retaining ring and said inner-end enlargement substantially equaling the axial depth of the countersunk recess whereby the inner end of the sleeve is disposed substantially flush with the inner face of said outer panel when said sleeve member is fully retracted, as aforesaid, means for securing the bolt to the sleeve member while permitting its outward movement to a fully retracted position with respect thereto, such means including a second retaining ring encircling said bolt and having a key and slot connection therewith and whose outer edge seats in an internal groove provided in the inner wall of said sleeve member near its inner end, said connection comprising a key-like formation protruding from the inner edge of said second ring which extends into an axial slot in the periphery of the bolt, said slot being closed at its inner end by a shoulder which is spaced from the said inner end a distance such that when the key engages on same the inner end of the bolt is flush with the inner end of said sleeve member, and resilient bolt-retracting means on said bolt effective between the bolt and said sleeve member for urging said bolt to a normal, partially retracted position with respect to said outer panel, the construction and arrangement being such that in being further moved to its fully retracted position the bolt effects movement of the sleeve member to its fully retracted position aforesaid.

2. The combination substantially as set forth in claim 1, wherein the outer peripheral surface of the sleeve member and the inner edge of said retaining ring are provided with complementary formations which interfit with one another to key the ring to said sleeve member.

References Cited in the file of this patent

UNITED STATES PATENTS

| | | |
|---|---|---|
| 1,664,820 | Hughes | Apr. 3, 1928 |
| 2,426,857 | Birkenmaier | Sept. 2, 1947 |
| 2,640,244 | Becker | June 2, 1953 |
| 2,640,245 | Becker | June 2, 1953 |
| 2,695,436 | Marschner | Nov. 30, 1954 |
| 2,839,808 | Zahodiakin | June 24, 1958 |
| 2,850,781 | Pachmayr | Sept. 9, 1958 |

FOREIGN PATENTS

| | | |
|---|---|---|
| 727,499 | Germany | Nov. 4, 1942 |
| 604,017 | Great Britain | June 28, 1948 |